United States Patent [19]

Walchuk

[11] 4,061,312

[45] Dec. 6, 1977

[54] APPARATUS AND METHOD FOR PROTECTING WHEEL MOVE IRRIGATION SYSTEMS WITH ELECTRIFIED FENCE

[76] Inventor: Thomas S. Walchuk, Box 792, Ronan, Mont. 59864

[21] Appl. No.: 734,364

[22] Filed: Oct. 20, 1976

[51] Int. Cl.[2] ........................ A01K 3/00; A01G 25/09; H01B 17/16

[52] U.S. Cl. ........................................ 256/10; 137/344; 137/377; 174/163 F; 174/175; 239/177; 239/212

[58] Field of Search ........... 174/158 F, 161 F, 163 R, 174/163 F, 175; 256/10; 239/177, 212, 213, 288, 288.3, 289; 137/344, 377

[56] References Cited

U.S. PATENT DOCUMENTS

| | | | |
|---|---|---|---|
| 2,386,129 | 10/1945 | Maack | 256/10 X |
| 2,456,547 | 12/1948 | Weber | 174/161 F X |
| 2,618,685 | 11/1952 | Lewis | 256/10 X |
| 2,896,011 | 7/1959 | Huseby | 174/163 F |
| 3,654,383 | 4/1972 | Wilson | 174/163 F |
| 3,820,758 | 6/1974 | Berg, Jr. et al. | 174/163 F X |

*Primary Examiner*—Laramie E. Askin
*Attorney, Agent, or Firm*—Merchant, Gould, Smith, Edell, Welter & Schmidt

[57] ABSTRACT

A method is disclosed for protecting assembled wheel move irrigation systems from being damaged by cattle grazing in a field where such a system is located, which includes the clamping of an insulator utilizing an over-center clamping arrangement on the rim of each ground-engaging wheel of the system and electrifying a wire strung along the length of the system and supported by a wire-engaging means on the face of each clamp-on insulator.

8 Claims, 6 Drawing Figures

APPARATUS AND METHOD FOR PROTECTING WHEEL MOVE IRRIGATION SYSTEMS WITH ELECTRIFIED FENCE

BACKGROUND OF THE INVENTION

1. Field of the Invention

This invention relates to the field of devices for protecting movable irrigation systems from damage by grazing animals. More particularly, this invention relates to the use of electrified wires to protect such irrigation systems of the wheel move type.

2. Description of the Prior Art

Frequently, farmers and ranchers, particularly in the arid Western United States, find need for large irrigation systems in their fields. Resort is often had to irrigation systems of the "wheel move" type. These systems are elaborate, but consist basically of a large number of ground-engaging wheels with a conduit, comprising a plurality of sprinkler pipes, extending through their hubs. Thus, the conduit is supported by the wheels and provides an axis of rotation for them. These systems are generally quite large — having wheels of up to six feet or greater diameter and length equal to the length of an entire pasture — and once assembled, they become permanent fixtures of the pasture or hayfield in which they are situated. Cattle or other livestock are commonly pastured in fields wherein one of such irrigation systems is located, thus leading to the problem which this invention seeks to solve: while cattle will not bother an operating irrigation system, once the system is not in use, cattle tend to bump into and rub against the system, frequently causing great damage to the pipes, risers, and wheels.

Previously, the only solutions available to the rancher were either to disassemble the system completely when not in use, or else to roll the system to the boundary of the field and then build a fence around it by setting fence posts and stringing fence wire. The cost, in terms of time and money, make the first alternative out of the question. The time involved in the second alternative, and the inconvenience of having to tear down a fence when it is desired to move the irrigation system, make the second alternative highly unsatisfactory.

SUMMARY OF THE INVENTION

The present invention gives the rancher or farmer a quick, convenient, and easy-to-practice method of protecting an assembled wheel move irrigation system by providing a clamp-on insulator adapted to fit on the wheel rims of such a wheel move system. The insulator is comprised of a base plate with a fence wire holding means on its face, and an over-center clamping means to easily attach and remove the insulator from the wheel rims.

In practice, the irrigation system is rolled against a permanent boundary fence of the field, the insulators are clamped to the wheel rims on the side of the system facing the pasture, and an electrified fence line is strung along the system, releasably engaged with the holding means on each insulator. When the wire is energized, the system will be protected from the bumps and scrapes of grazing livestock. Alternatively, if there is no permanent boundary fence in the field, electric wire can be strung along both sides of the system after insulators have been mounted on both sides of the wheel rims. When it is again expedient to operate the irrigation system, the electrified line can be easily removed from the insulators and rolled up in a minimum amount of time for re-use when the system is again in a stored condition. The insulators may be removed or left on the wheels depending upon the type of terrain and ground conditions over which the wheel move irrigation system is being operated.

DESCRIPTION OF THE PREFERRED EMBODIMENT

Figure 1:
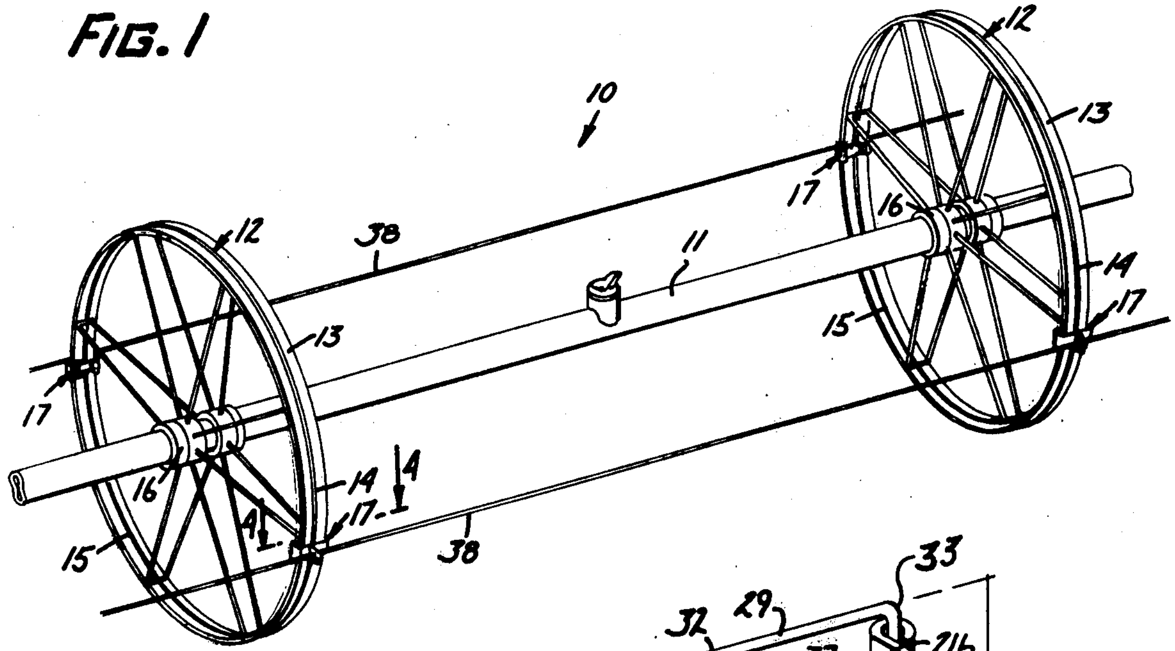
FIG. 1 is a view in perspective showing the invention.
Figure 2:
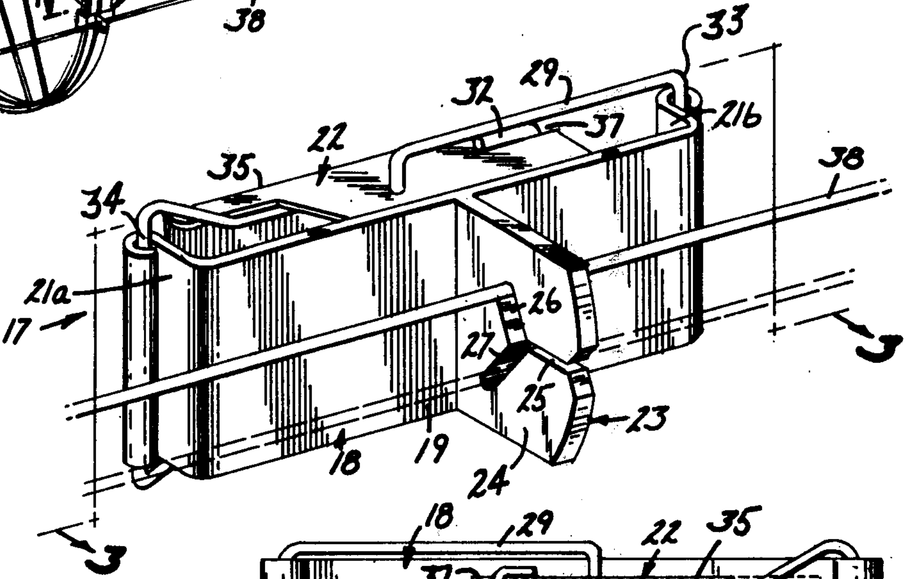
FIG. 2 is an enlarged perspective of a clamp-on insulator used in the protective system.
Figure 3:
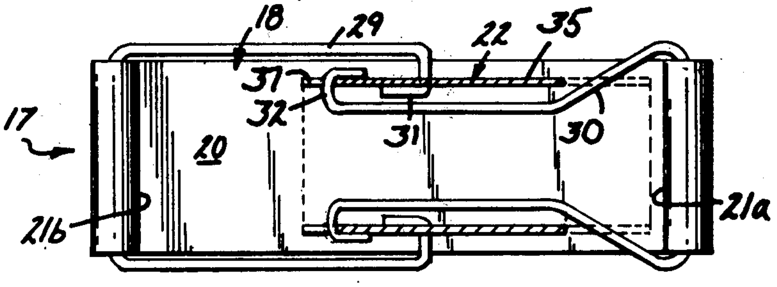
FIG. 3 is a sectional view of the clamp-on insulator shown in FIG. 2, taken along the line 3—3 of FIG. 2 as indicated by the arrows.
Figure 4:
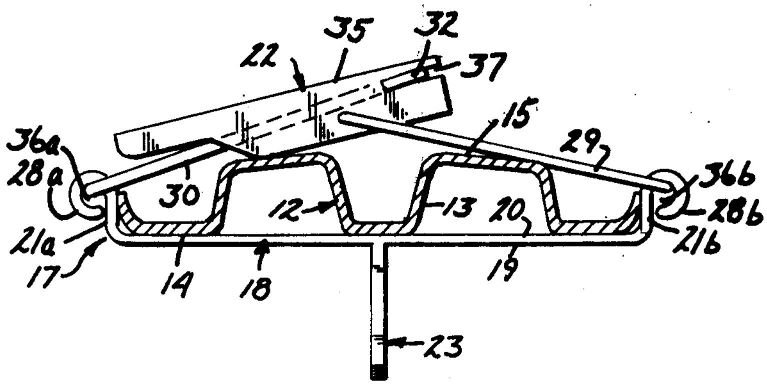
FIG. 4 is an enlarged horizontal section of a portion of FIG. 1 along the line 4—4 of FIG. 1.

FIG. 1 shows a portion of a wheel move irrigation system 10 which includes a single conduit 11 formed by a plurality of sprinkler pipes flexibly connected, and a plurality of sprinkler irrigation wheels 12, each having a rim 13 with a ground-engaging surface 14 and a spoke-engaging surface 15. Conduit 11 extends through, and is supported by, the hubs 16 of wheels 12. At least one clamp-on insulator 17, one embodiment of which is more clearly illustrated in FIGS. 2, 3 and 4, is releasably mounted on each wheel rim 13. The insulators 17 are mounted on rims 13 on a side from which direction grazing animals may approach system 10.

Insulator 17 comprises a U-shaped base plate 18 having a face portion 19, a back portion 20, and two opposite arm portions **21*a* and 21*b*, and over-center clamping means 22. Electrified fence wire support means 23 are located on face portion 19, comprising in the preferred embodiment flange 24 extending perpendicularly from face portion 19 and having a centrally located wire-engaging slot 25 which terminates in upper and lower wire-receiving branch slots 26 and 27. In the preferred embodiment, base plate 18 and support means 23 are constructed of plastic, but other suitable insulating materials may be used in other embodiments. Opposite arm portions 21*a* and 21*b* are each of a length generally equal to the distance between ground-engaging surface 14 and spoke-engaging surface 15 of rim 13, and have opposite end portions 28*a* and 28*b*** thereon.

Over-center clamping means 22 comprise two cooperating clamping arms 29 and 30 having inner portions 31 and 32 and outer portions 33 and 34, and a buckle element 35 connected to inner portions 31 and 32. In the preferred embodiment, a portion of each of the opposite end portions **28*a* and 28*b* is folded upon itself to form channel portions 36*a* and 36*b*, providing means for connecting outer portions 33 and 34 to opposite end portions 28*a* and 28*b***.

To allow over-center clamping means 22 to open and accommodate wheel rim 13, which is to be disposed between back portion 20 and clamping means 22, there must be one point where one of clamping arms 29 or 30 is releasably connected. In the preferred embodiment, that point is the point where inner portions 32 of clamping arm 30 are engaged by notch portions 37 of buckle element 35, however, it could be at the point where inner portions 31 are connected with buckle element 35, or at the position where outer portions 33 and 34 are connected with opposite end portions 28*a* and 28*b*.

Figure 5:
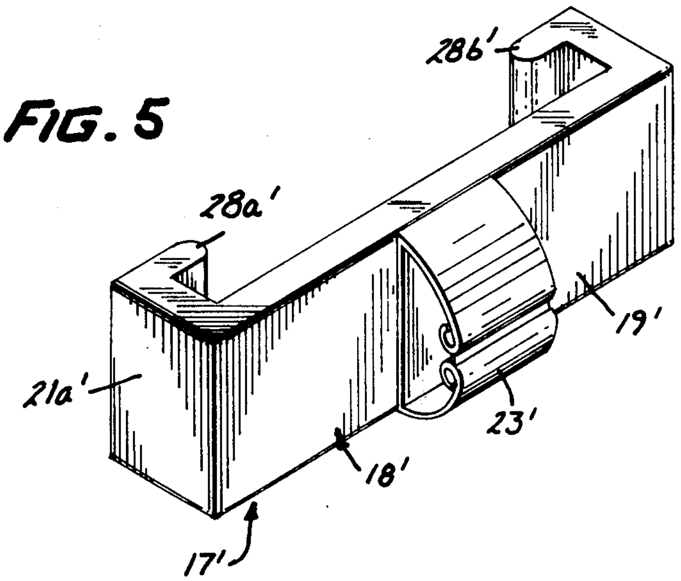
FIG. 5 is an enlarged perspective of a second embodiment of the clamp-on insulator used in the protective system.
Figure 6:
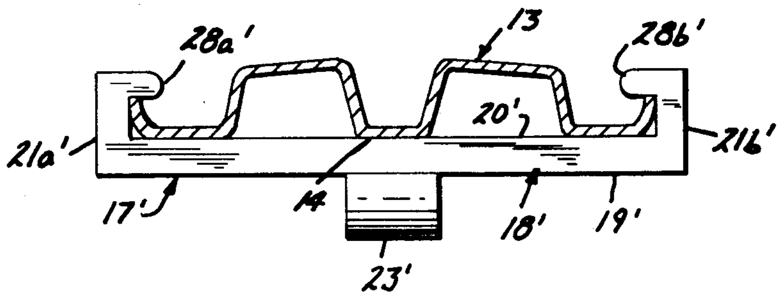
FIG. 6 is a sectional view similar to FIG. 4, showing the clamp-on insulator of FIG. 5 mounted on a wheel rim.

In another embodiment, shown in FIG. 5, insulator 17′ comprises a U-shaped base plate 18′ having a face portion 19′, a back portion 20′ and two opposite arm portions 21*a*′ and 21*b*′ terminating in opposite end portions 28*a*′ and 28*b*′. Fence wire support means 23′ are mounted on face portion 19′. Base plate 18′, including arms 21*a*′ and 21*b*′, is constructed of a flexible plastic material, and arm portions 21*a*′ and 21*b*′ are each of a length generally equal to the distance between ground-engaging surface 14 and spoke-engaging surface 15 of rim 13, whereby insulator 17′ may be simply snapped onto rim 13. When so mounted, opposite end portions 28*a*′ and 28*b*′ frictionally engage the spoke-engaging surface 15 of rim 13 while back portion 20′ frictionally engages ground-engaging surface 14, as shown in FIG. 6.

Once insulators 17 have been mounted on wheel rims 13, an electrified fence wire 38 is strung out along system 10, and then engaged with slot 25 in support means 23 of insulator 17 on each successive wheel rim 13 along system 10; if a wheel 12 is on higher ground than the wheels 12 on either side thereof, wire 38 will be clipped into lower branch slot 27 of insulator 17 on that wheel rim 13, conversely, if a wheel 12 is on lower ground than the wheels 12 on either side thereof, wire 38 will be clipped in upper branch slot 26 of insulator 17 on that wheel rim 13. In this manner, wire 38 will be supported and restrained from moving in relation to system 10. The branch slots 26 and 27 serve another function. If an insulator 17 is mounted on a wheel rim 13, and wheel 12 is rolled over so that insulator 17 is on the other side of system 10, the wire 38 will, in some cases, simply drop by gravity into what would then be the lower slot on the opposite side, or the wire 38 can be easily shifted to the lower slot by hand.

With wire 38 in place, it is energized so that any animal coming in contact therewith will receive an electrical shock and be turned away from system 10 before it can do any damage to conduit 11 or wheels 13.

To summarize, a wheel move irrigation system 10 can be easily protected from grazing animals while not in use in the field where it is located by releasably mounting a clamp-on insulator 17 on each of the wheel rims 13 of the system 10 to be protected and energizing an electrified fence wire which has been strung along system 10, supported by means 23 on each insulator 17. When it is again desired to utilize system 10 for irrigation purposes, wire 38 can be easily removed from insulators 17 and stored for future use. Insulators 17 may be quickly removed from rims 13, or left in place while system 10 is wheeled to the desired location, depending upon the type of terrain and ground condition over which the wheel move system 10 is being operated.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A protective system for wheel move irrigation systems which include an elongated conduit supported by, and extending through, the hubs of a plurality of ground-engaging sprinkler irrigation wheels, each of said wheels having a rim with a ground-engaging surface, comprising:

a. a plurality of insulators having support means thereon to releasably engage an electrified fence wire, at least one of said insulators being releasably mounted on each of said sprinkler irrigation wheel rims; and b. at least a single electrified fence wire extending along the length of said irrigation system, said wire being supported along its length by said support means.

2. The protective system of claim 1 wherein each of said wheel rims further includes a spoke-engaging surface, and wherein each of said insulators comprises:

a. a generally U-shaped base plate adapted to be mounted on a sprinkler irrigation wheel rim, said base plate having a face portion, a back portion, and two generally flexible arm portions with opposite end portions thereon, said arm portions being generally parallel to each other and in planes generally perpendicular to the plane of said face portion, each of said arm portions being of a length generally equal to the distance between the ground engaging surface and the spoke-engaging surface of the wheel rim, whereby said opposite end portions engage said spoke-engaging surface when the insulator is mounted on a wheel rim; and b. said support means to releasably engage electrified fence wire being located on said face portion.

3. A clamp-on insulator comprising:

a. an elongated base plate adapted to be mounted on a sprinkler irrigation wheel rim having a ground-engaging surface and a spoke-engaging surface, said base plate having a face portion, and two opposite end portions;

b. electrified fence wire engaging means on said face portion;

c. over-center clamping means comprising two cooperative clamping arms, each said arm having outer and inner portions, and a buckle element connected to said inner portions of each said clamping arm, said wheel rim being disposed between said base plate and said clamping means when said insulator is mounted on said wheel rim; and d. means connecting said outer portion of each of said clamping arms with said respective opposite end portions of said base plate, one of said inner and outer portions of said clamping arms being releasably connected.

4. The clamp-on insulator of claim 3 wherein said buckle element releasably engages said inner portion of one of said clamping arms.

5. The clamp-on insulator of claim 3 wherein said base plate is generally U-shaped, having a face portion, a back portion, and two arm portions with said opposite end portions thereon, said arm portions being generally parallel to each other and in planes generally perpendicular to the plane of said face portion, each said arm portion being of a length generally equal to the distance between the ground-engaging surface and the spoke-engaging surface of the sprinkler irrigation wheel rim.

6. The clamp-on insulator of claim 5 wherein said wire engaging means comprise a flange projecting generally perpendicular from said face portion, said flange having a centrally located slot therein, said slot terminating in upper and lower wire receiving branch slots.

7. A clamp-on insulator for use in a protective system for wheel move irrigation systems which include an elongated conduit supported by, and extending through the hubs of a plurality of ground-engaging sprinkler irrigation wheels, each of said wheels having a rim with a ground-engaging surface and a spoke-engaging surface, comprising:

a. an elongated, generally U-shaped, base plate having a face portion, a back portion, and two arm portions in planes generally perpendicular to the plane of said face portion with opposite end portions thereon, each said arm portion being of a length generally equal to the distance between the ground-engaging and spoke-engaging surfaces of a sprinkler irrigation wheel rim;

b. electrified fence wire support means having a wire-engaging slot therein, on said face portion;

c. an over-center clamping means comprising two cooperating clamping arms, each said arm having outer and inner portions, and a buckle element connected to said inner portions of each said clamping arm, said wheel rim being disposed between said base plate and said clamping means, frictionally engaging said back portion and said arm portions, when said insulator is mounted on said rim; and d. means connecting said outer portion of each of said clamping arms with said respective opposite end portions of said base plate, one of said inner and outer portions of said clamping arms being releasably connected.

8. The method of protecting the sprinkler pipes of a wheel move irrigation system, in which a plurality of said pipes are flexibly connected to form a single conduit supported by, and extending through, the hubs of a plurality of sprinkler irrigation wheels having ground-engaging rims, from damage by cattle or other livestock rubbing against said pipes when grazing in a field wherein one of said systems is located, comprising the steps of:

a. releasably mounting an insulator with a wire-engaging support means thereon on each said ground-engaging rim of each said wheel in said irrigation system on a side of said system from which direction cattle may approach, at such a height that, when a wire is strung along said system, engaging said support means, cattle or other livestock approaching said system come in contact with said wire;

b. stringing an electric fence wire along said system;

c. engaging said wire with said wire-engaging support means of each said insulator to support said wire along its length and restrain said wire from movement in relation to said system; and d. energizing said supported fence wire.

* * * * *